(12) United States Patent
Rahmstorf et al.

(10) Patent No.: US 7,546,893 B2
(45) Date of Patent: Jun. 16, 2009

(54) FRONT WALL MODULE

(75) Inventors: Peter Rahmstorf, Saint Laurent du Pont (FR); Lydia Creutz, Ingwiller (FR); Eric Schaetzel, Fort-Louis (FR); Siegfried Müller, Jetzendorf (DE); Klaus Vornhof, Riemerling (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 369 days.

(21) Appl. No.: 10/513,893

(22) PCT Filed: May 12, 2003

(86) PCT No.: PCT/EP03/04933

§ 371 (c)(1),
(2), (4) Date: Jun. 15, 2005

(87) PCT Pub. No.: WO03/095290

PCT Pub. Date: Nov. 20, 2003

(65) Prior Publication Data

US 2005/0236199 A1    Oct. 27, 2005

(30) Foreign Application Priority Data

May 13, 2002  (DE) ................. 102 21 950

(51) Int. Cl.
*B60K 11/04* (2006.01)

(52) U.S. Cl. ............... 180/68.3; 180/68.4; 296/192

(58) Field of Classification Search ........... 180/68.3, 180/68.4; 296/192, 203.02, 70, 72
See application file for complete search history.

(56) References Cited

U.S. PATENT DOCUMENTS

| 4,597,461 A * | 7/1986 | Kochy et al. ............ 180/90 |
| 5,358,300 A | 10/1994 | Gray |
| 5,934,744 A * | 8/1999 | Jergens et al. ............ 296/192 |
| 5,992,925 A * | 11/1999 | Alberici ................ 296/203.02 |
| 6,234,569 B1 * | 5/2001 | Derleth et al. ............ 296/208 |
| 6,276,739 B1 * | 8/2001 | Wich .................... 296/72 |
| 6,474,716 B2 * | 11/2002 | Shikata et al. ............ 296/70 |
| 6,641,195 B2 * | 11/2003 | Shikata et al. ............ 296/70 |
| 6,644,722 B2 * | 11/2003 | Cooper ................ 296/187.02 |
| 6,705,670 B2 * | 3/2004 | Forssell et al. .......... 296/187.09 |

FOREIGN PATENT DOCUMENTS

| DE | 19732341 | 2/1999 |
| DE | 101 03 252 | 8/2002 |
| EP | 0456531 | 11/1991 |
| GB | 2329363 | 3/1999 |

* cited by examiner

*Primary Examiner*—Christopher P Ellis
*Assistant Examiner*—Brian Swenson
(74) *Attorney, Agent, or Firm*—Fay Kaplun & Marcin, LLP

(57) ABSTRACT

Describe is a front wall module for a motor vehicle. The front wall module forms at least one area of a front wall that defines the passenger compartment of a motor vehicle. The front wall module contains functional units, such as the fan for ventilating the passenger compartment or the like. The front wall module has a capping piece that is connected to two longitudinal beams of the motor vehicle.

18 Claims, 24 Drawing Sheets

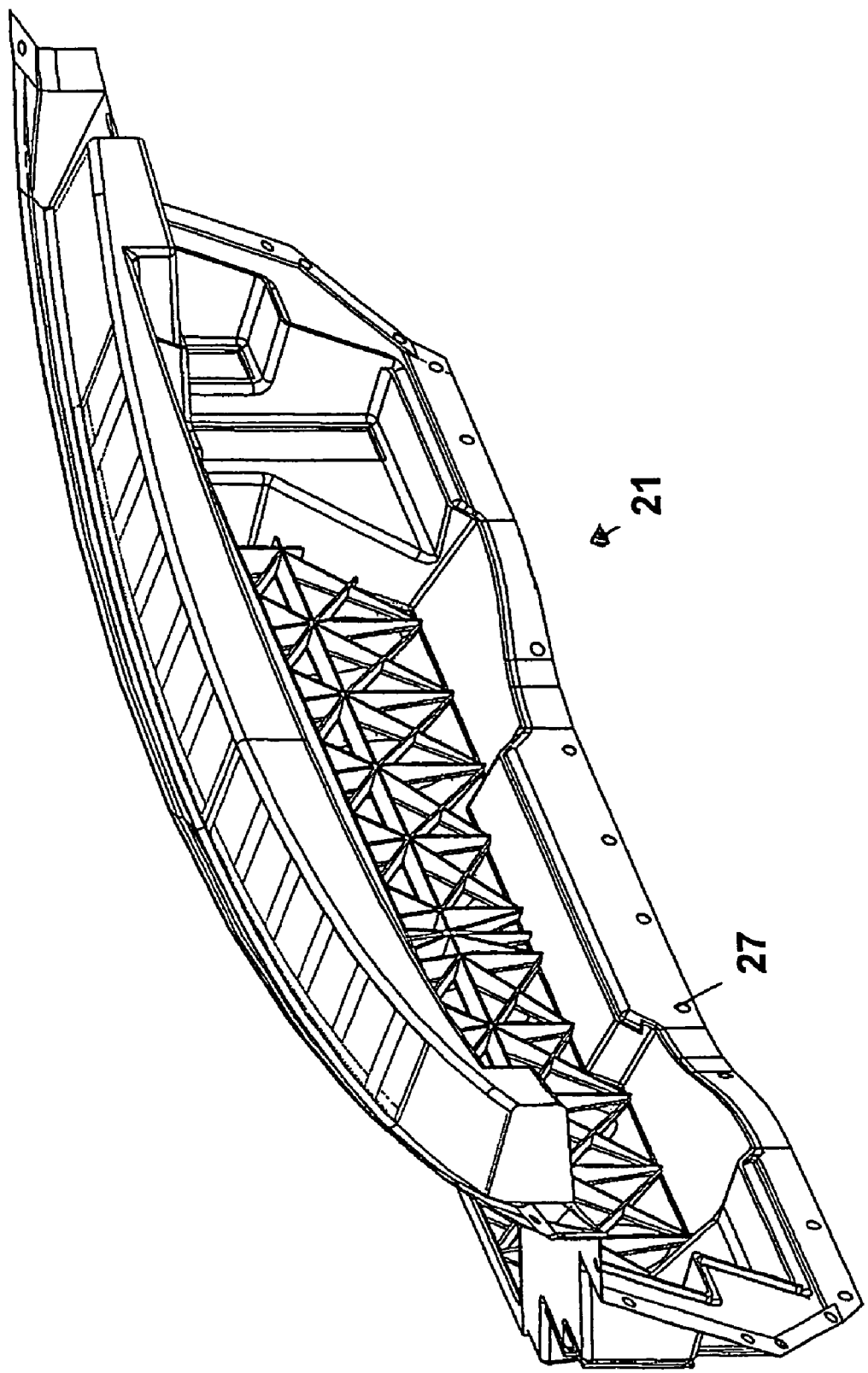

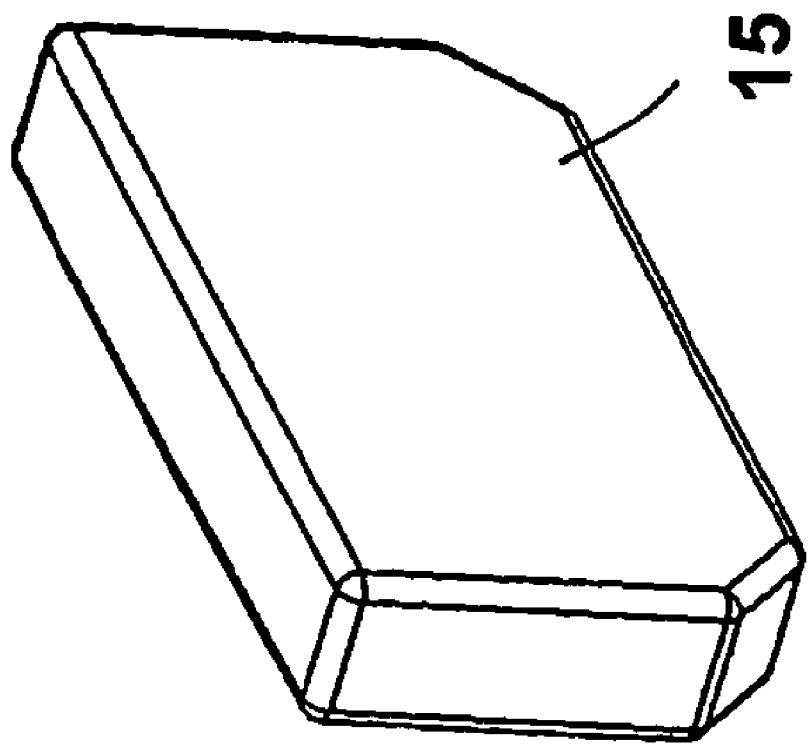

FRONT WALL MODULE

FIELD OF THE INVENTION

The present invention relates to a front wall module for a motor vehicle as well as to a motor vehicle.

BACKGROUND OF THE INVENTION

With the manufacture of motor vehicles it is usual for the vehicle to comprise a self-supporting vehicle body, wherein the vehicle body, for delimiting the vehicle interior seen in the direction of travel, comprises a so-called "front wall" which e.g. is designed as a sheet steel piece belonging to the vehicle body. Such a sheet steel piece at its upper end is usually connected to a hollow beam (a so-called "window bow") which is arranged above the front wall and which represents the lower connection surface for a windscreen of the motor vehicle.

This usual constructional shape has the advantage that a vehicle body may be premanufactured in an essentially fluid-tight manner and with a rigid structure. However it is of a disadvantage that the functional units in the region of the front wall, such as a fan for interior ventilation, parts of the vehicles electronics, etc. need to be individually assembled on the front wall in a very expensive manner. Due to this, extensive costs result during manufacture and the exchange of individual functional units is likewise very cost-intensive.

The British patent GB 2329363A specifies a front wall module for a motor vehicle. This forms the upper region of a front wall delimiting the interior of the motor vehicle. This front wall module in its inside, as a functional unit, comprises a fan for interior ventilation.

This known front wall module specifically has the advantage that it reduces the manufacturing expense, since functional units which are already modularly premanufactured may be incorporated into the motor vehicle. The disadvantage however is the fact that this concept falls short of the high safety demands. Furthermore on assembly, the bringing of the known front wall module through the vehicle interior into the region of the front wall can become somewhat of a problem.

SUMMARY OF THE INVENTION

The present invention relates to a front wall module for motor vehicle. The present invention allows a motor vehicle to be manufactured and repaired with little expense, while the highest safety demands are met.

An inexpensive and secure concept is made available by way of the fact that a front wall module according to the preamble additionally comprises a yoke beam which may be connected to two longitudinal beams of the motor vehicle.

Deviating from the previously hardened vehicle concepts, an additional beam is integrated into the front wall module, which significantly increases the stiffness of the vehicle body in the region of the front wall. By way of this, part of the stability task of the previously usual hollow beam may be assumed in the upper as well as lower region of the front wall, so that a greater design freedom for the vehicle as a whole arises.

By way of this it is also possible, also with smaller vehicle dimensions, to obtain an as large as possible vehicle interior, which may be fashioned in a practically infinite manner. By way of the attachment of the yoke beam according to the invention to the (usually two) longitudinal beams which run in the longitudinal direction on the outer sides of the vehicle body, an even better passive safety of the motor vehicle is ensured. This on the one hand relates to the side crash behaviour, since the lateral deformability of the motor vehicle (and thus the pressing together of the motor vehicle interior from the side) is reduced due to the yoke beam. Furthermore the frontal crash behaviour is improved, since a penetration of the front wall module into the interior of the motor vehicle is prevented.

Furthermore, the yoke beam according to the invention contributes to the torsional stiffness of the motor vehicle about the longitudinal axis, and the travelling comfort and long-term stability of the vehicle body is further improved on account of this.

A particularly advantageous embodiment envisages the yoke beam being connectable to the remaining front wall module with a non-positive fit, e.g. via screws. For this, the yoke beam may be manufactured in a simple manner of a very stable material (e.g. a profiled sheet steel) and may be e.g. screwed to the remaining front wall module in a simple manner. This is particularly easily possible on the outer side of the front wall module, thus towards the motor space with front motor vehicles. By way of a possible separation of the yoke beam and the remaining front wall module it is also possible, for various series of vehicles, to couple in each case only the different yoke beams but otherwise unchanged equal front wall modules to one another. By way of the non-positive connection (preferably screw connection, additionally a bonding may be useful under certain circumstances for sealing), it furthermore becomes possible to achieve a simple separability in the case of repair without e.g. having to worry about damage to the paintwork as occurs on welding (with subsequent corrosion problems). It is of course however also possible to envisage any positive-fit or material-fit joining method (in particular bonding).

A further advantageous embodiment envisages the yoke beam being able to be connected to the longitudinal beams of the motor vehicle with a non-positive fit, preferably via screws. This is advantageous with the manufacture of the vehicle as well as on exchange of the front wall module. It is possible in a relatively late stage of the motor vehicle production for the front wall module to be completely (and specifically "from above") inserted from the region of the motor space (with front motors). Here, welding is not necessary and vehicle paintwork is not damaged. At the same time it is particularly favourable that the longitudinal beams of the motor vehicle offer an attachment surface for the yoke beam. Under certain circumstances it is possible to weld suitable attachments on the longitudinal beams during the prior vehicle body manufacture, which offer an additional stability in the connection region. By way of such attachments it furthermore becomes easily possible, e.g. with front wall modules with a uniform yoke beam size, to accommodate one and the same front wall module (with identical yoke beams) in various sized vehicle bodies by way of varying the attachments. It is of course also possible here apart from the non-positive fit connection indicated as being advantageous here, to provide positive-fit or material fit connections, in particular bonding.

A particularly advantageous further embodiment envisages several functional units being accommodated in the front wall module. This e.g. may be one (or several) fans for interior ventilation, an interior air filter, a heating body for interior ventilation, an evaporator of an air-conditioning installation, an air channel system, a control unit for the electronic control of elements in the interior of the motor vehicle, a cable loom connected to the control unit, an airbag or likewise.

It thus becomes possible to connect these individual functional units to one another within the front wall module already during premanufacture of the vehicle. A particularly advantageous further embodiment envisages the front wall module comprising so-called "collectors" which are connected to the cable loom or to the control unit. These collectors may serve as electrical interfaces between the front wall module and the remaining motor vehicle (thus e.g. with elements of the motor electronics, door locking, lighting etc.). These collectors may e.g. be attached to the lateral outer sides of the front wall module. By way of this a particularly easy connection for standardised data buses to the collectors becomes possible, and by way of a simple exchange of the collectors, an electrical or electronic connection of the front wall module to various model series becomes possible.

A further, particularly advantageous further embodiment envisages the front wall module having a cavity construction with an outer casing (covering), wherein the outer casing is formed by a front wall inner part which is directed towards the motor vehicle interior, and a front wall outer part which is distant to the motor vehicle interior. Due to this it becomes possible for the individual functional units to be accommodated in the inside of the front wall module and on the one hand to be protected from damp and moisture influences etc., and on the other hand the passive safety is increased in that these functional units do not represent any danger to the vehicle passengers in the case of a collision. Within the concept of a simple manufacturability or repair ability, one may provide a "layered construction", wherein individual functional units as "sub-modules" are layered between the front wall outer part and inner part. With such a shell-like cockpit construction the individual functional units such as an air conditioning installation unit may be incorporated into the front wall module already premanufactured. In this manner, with special fittings to the motor vehicle one may also simply realise different customer wishes during manufacture, or these may be retrofitted at a later point in time.

Further advantageous embodiments furthermore envisage the front wall module itself contributing to the stiffening and improvement of the safety of the vehicle. Thus e.g. the front wall outer part and/or the front wall inner part may be connected as a hybrid part of metal with plastic connected thereto (e.g. in a honeycomb construction manner). A simple manufacturability is provided on account of this, a separation of the material on reuse is simplified and the manufacturing costs are low. Furthermore it is also possible to provide further supporting parts e.g. a hollow beam in the upper region of the front wall module which here assumes the function of a "window bow". By way of the fact that in this case the shell of the motor vehicle does not need to contain an already previously fixed window bow, an even simpler assembly of the front wall module is possible ("from above", thus not necessarily from the vehicle interior).

At the same time it is becomes possible to already accommodate a "water box" for collecting fluid running down from the motor vehicle windscreen, on the front wall module, which e.g. may already contain windscreen wiper motors etc.

The front wall module according to the invention may be applied in various vehicle types. For obtaining a particularly large space for the feet for the vehicle passengers, it is useful to attach the front wall module for filling out in the upper region of the front wall, wherein a sheet steel composite which is profiled or provided with cavities is provided only in the lower front wall region. In particular, for future "drive by wire" applications it is useful to provide a receiver for a steering column for controlling the motor vehicle on the inner front wall part of the front wall module. By way of this, the steering unit is de facto separated from the shell. Alone by way of the provision of different front wall modules during manufacture, one may realise a right-hand or left-hand drive vehicle. A later retrofitting is also easily possible.

BRIEF DESCRIPTION OF DRAWINGS

The invention is explained by way of several Figures. There are shown in.

DETAILED DESCRIPTION

Figure 1A:
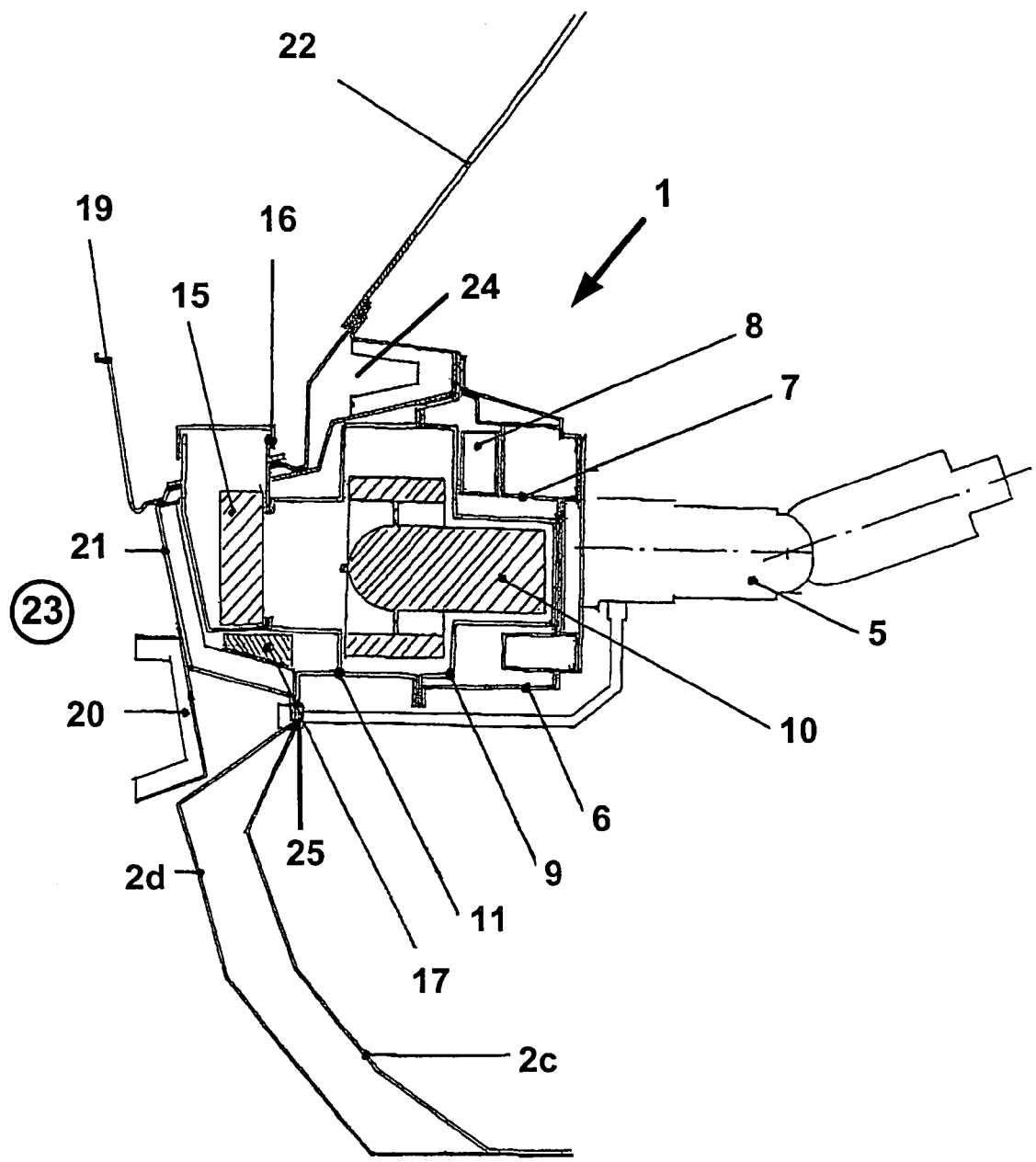
FIGS. 1a to 1d several sections through a front wall module according to the invention, in a motor vehicle, FIG. 2 a perspective front view of a part of a motor vehicle according to the invention, FIG. 3 an exploded drawing of the individual parts of the front wall module according to the invention, in a vehicle, FIGS. 4a to 4r individual parts of a front wall module according to the invention.

FIG. 1a shows a cross section through a motor vehicle, with a front wall module according to the invention. A lateral cross section in the region of the driver seat is shown.

In the following the front wall module 1 is dealt with in more detail.

This forms the upper region of a motor vehicle front wall which delimits the motor vehicle interior in the travelling direction. A front [wind] screen 22 borders the front wall module 1 to the top, and towards the bottom there connects a vehicle floor 2c as well as a reinforcement of the vehicle floor 2d which belong to a shell of the motor vehicle and form the lower region of the front wall of the vehicle. The front wall module forms the upper region. The front wall module at its side which is directed towards a motor space and is distant to the motor vehicle interior comprises a yoke beam 20 which by way of screw connections connects two longitudinal beams of the motor vehicle running on the longitudinal sides of the vehicle to one another. The yoke beam 20 is connected with a non-positive fit (screwed) to the remaining front wall module. The remaining front wall module contains a front wall outer part 21 to which the yoke beam 20 is screwed.

The front wall outer part 21 as well as a front wall inner part 6 are connected to one another and form a cavity construction with an outer casing, wherein the outer casing is formed by the inner front wall part 6 directed towards the motor vehicle interior, and the outer front wall part 21 distant to the motor vehicle interior.

Several functional units are accommodated within the cavity, and their function and arrangement will be dealt with in more detail later. Here it is the case e.g. of a filter 15 in a filter box 16, a fan 10, a cable loom 17, a defroster channel 8, an air channel system 7. The fan 10 is arranged in a layer-like construction between an air-conditioning installation front wall 9 and an air-conditioning installation rear wall 11 which will likewise be described in more detail later. To the motor vehicle interior, a steering column 5 via which the motor vehicle may be electrically controlled, connects to the front wall inner part 6. Alternatively or additionally it is of course also possible to provide a hydraulic or mechanical steering force transmission.

A water box (chamber) 19 is attached to the upper side of the front wall module and this water box likewise belongs to the front wall module and collects liquid running down from the front [wind]screen 22 of the motor vehicle. The water box 19 as well as the front wall outer part 21 in the upper region of the front wall module, thus in the connection region to the front [wind]screen 22 form a hollow beam 24 for stabilising the front wall module in the region of the front windscreen of the motor vehicle. In this manner one realises an upper transverse beam, a so-called "window bow". It is however also possible for the vehicle body in this region to envisage an additional transverse beam for the connection of both A-columns.

The front wall module 1 is screwed to the vehicle body 2 of the motor vehicle. Apart from a lateral screwing in the region of the A-columns, amongst other things a screwing in the region 25 towards the vehicle floor is also given.

Figure 1B:
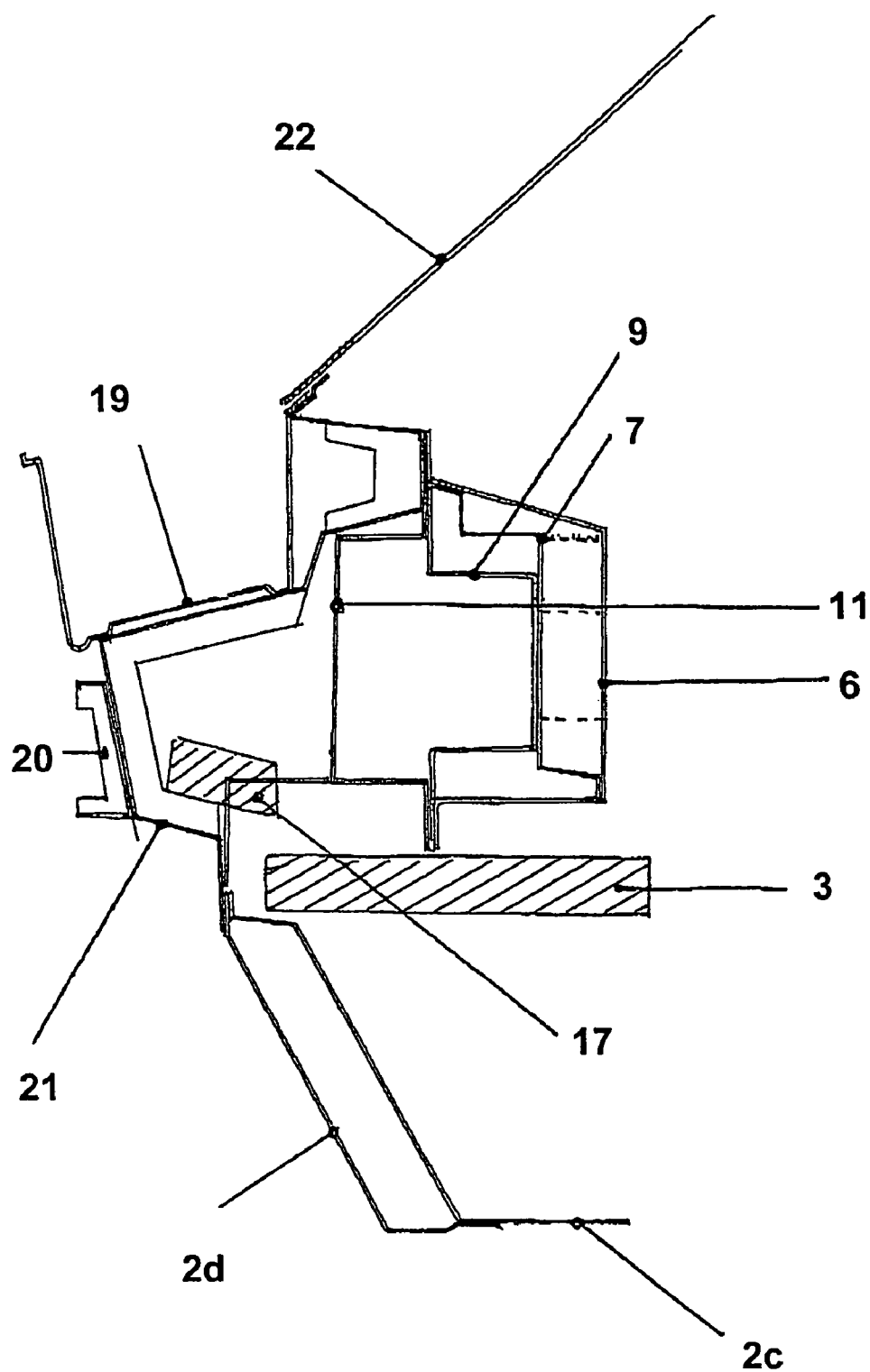

FIG. 1*b* shows a cross section through a motor vehicle according to the invention, which is parallel to that in FIG. 1*a*. The same reference numerals as drawn in FIG. 1*a* here show the same elements so that a description is not made again to save repetition. A control unit 3 is shown on the lower side of the front wall module in FIG. 1*b* and this unit is electrically connected to the cable loom 17.

Figure 1C:
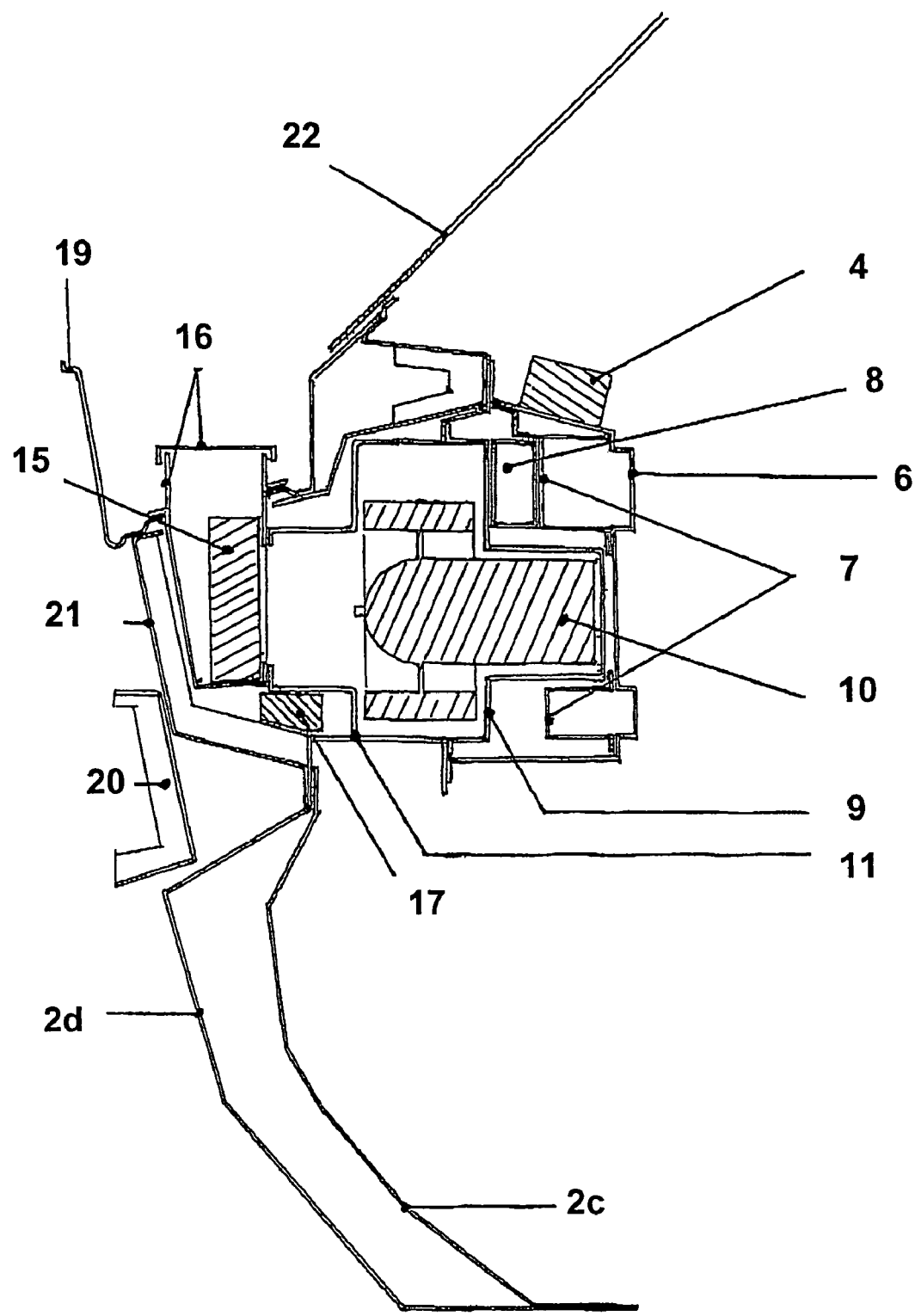

FIG. 1*c* again shows a parallel section to the FIGS. 1*a* and 1*b*. A section in the region of the front passenger seat is shown. On the upper side of the front wall inner part 6 there is attached an airbag 4 which is covered towards the motor vehicle interior by way of a dashboard which is not shown.

Figure 1D:
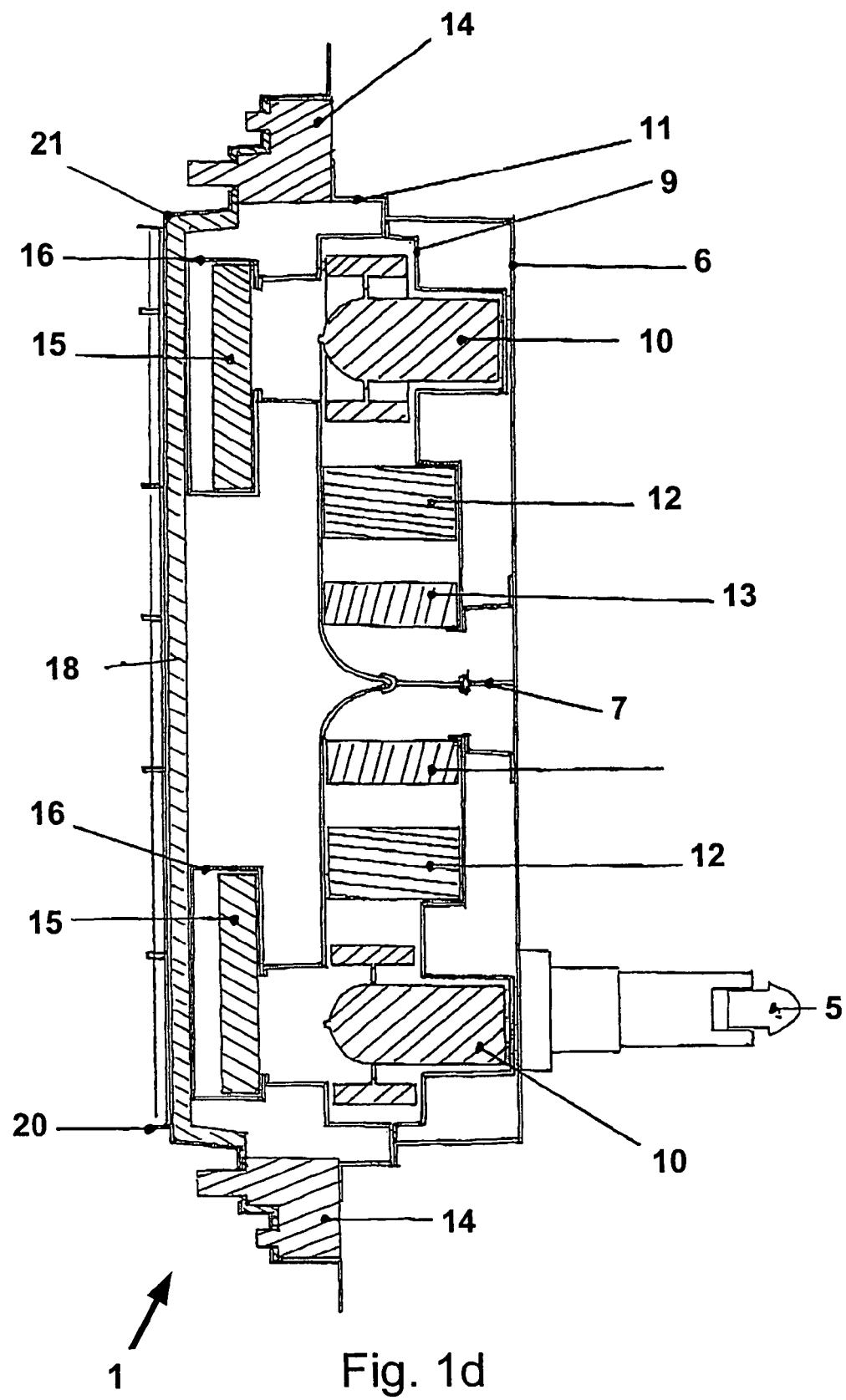

FIG. 1*d* shows a horizontal section through the front wall module according to the invention, at the height of the steering column.

Here one may recognise particularly well that the front wall module according to the invention, advancing from the left to the right, has a layered construction.

Beginning from the left one may firstly recognise a yoke beam 20. This, as may already be seen by way of viewing together the FIGS. 1*a* to 1*c*, has an arch-like course (with the highest point in the middle of the vehicle). In cross section, the yoke beam 20 is essentially "U" shaped and comprises reinforcement webs which are distanced to one another. The yoke beam 20 is screwed to the front wall outer part 21. This front wall outer part 21 on its outer side has a metal skin which on the inner side is reinforced by a honey-comb-like plastic structure. An insulation 18 connects to this. Proceeding to the right then a filter box 16 with a filter 15 contained therein (in each case on each vehicle side) is attached. Subsequently, but not seen here, a cable loom (indicated at 17 in FIG. 1*c*) is arranged which is connected to collectors 14 on the left and on the right vehicle side. These collectors represent electrical interfaces between the front wall module and the remaining vehicle. They serve e.g. for the attachment to the electronics of the motor, to a door locking, to a lighting etc. Also a connection, preferably a screwing of the front wall module to the A-columns of the motor vehicle takes place in the region of these collectors. The collectors may be matched in their size or interface definition to individual vehicle types. Thus various collectors may be combined for one and the same front wall outer part.

Figure 3:
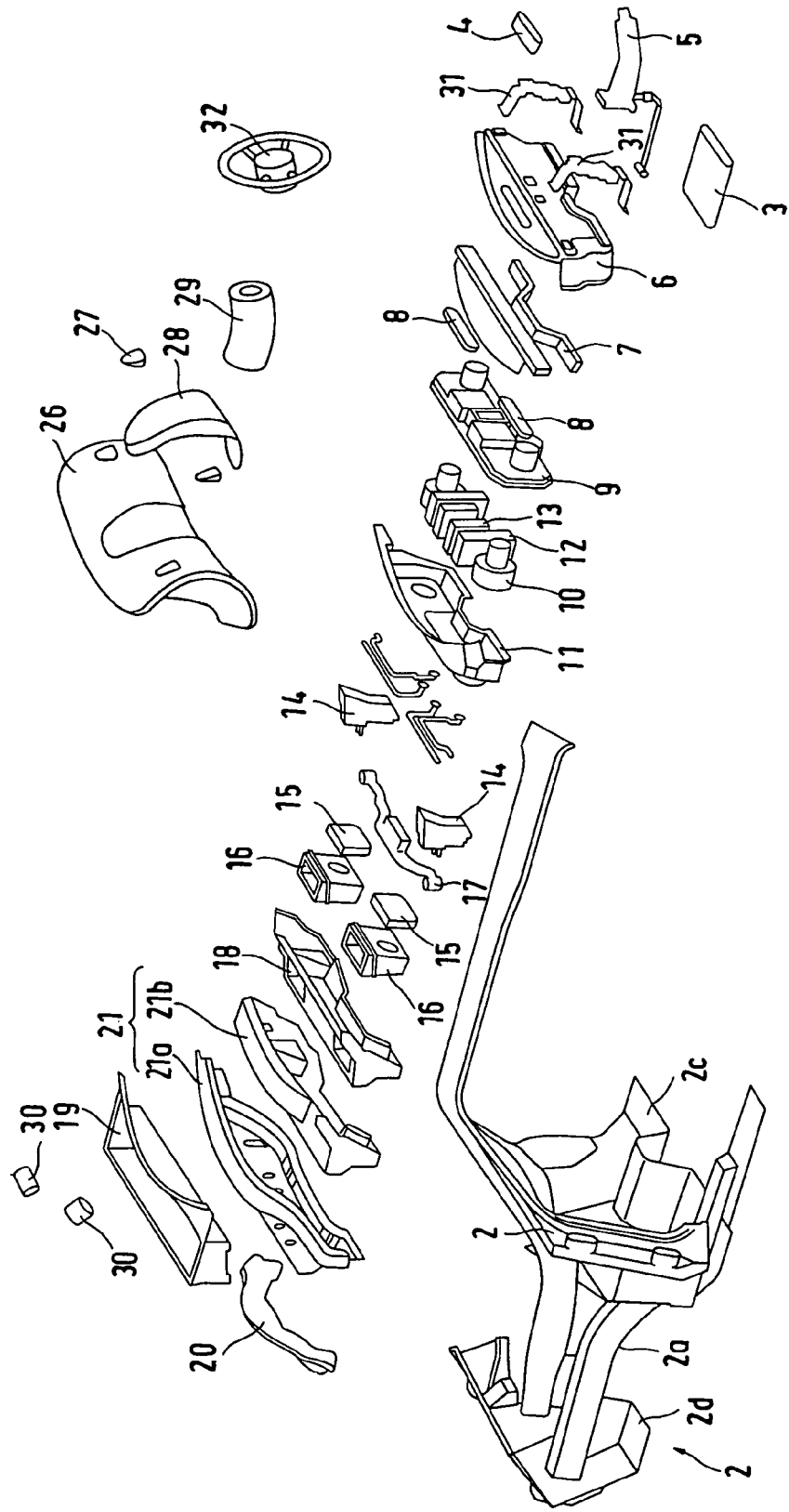

In FIG. 1*d*, proceeding further to the right, as a next location, the air-conditioning installation rear wall 11 is shown, which forms a cavity with the air-conditioning installation front wall 9 which is incorporated further to the right. A blower 10, an evaporator for the air-conditioning installation 12 as well as a heating body 13 are attached in this cavity on each vehicle side. On the right, connecting to the air-conditioning installation front wall 9, are defroster channels 8 (see FIG. 1*c*) as well as an air channel system 7 for air distribution in the inner space of the motor vehicle. Connecting to this is a front wall inner part 7 on which the steering column 5 is fastened. In FIG. 3 one may see that the front wall inner part 6 is provided with an outer skin towards the motor vehicle interior, in which discharge [piece] 27, a middle console 28 and a steering column covering 29 are assembled.

It is to be mentioned that by way of the intermediate connection of connection pieces on the front wall module according to the invention it becomes possible to adapt the front wall module according to the invention to different vehicle body widths.

Figure 2:
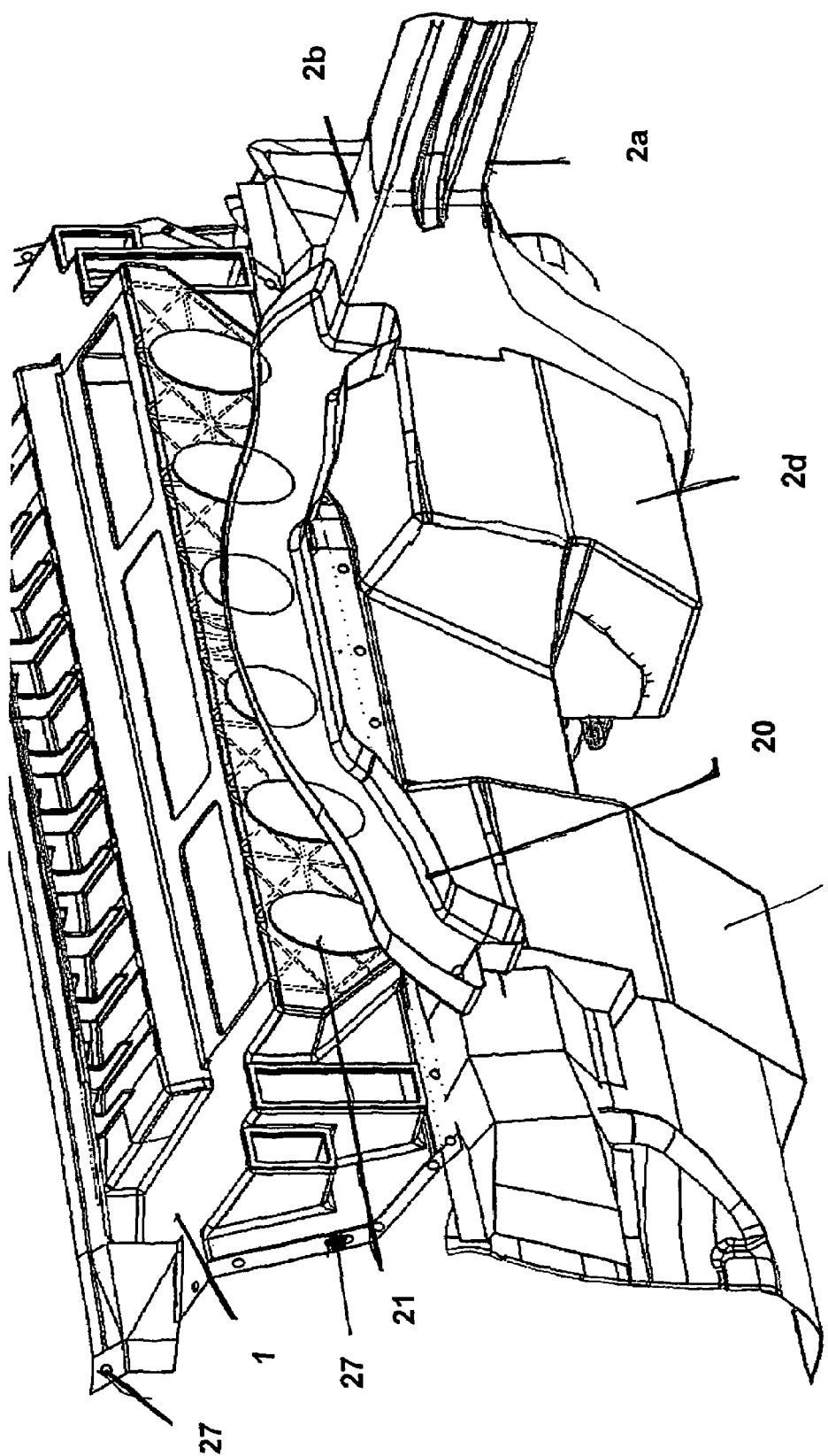

FIG. 2 shows perspectively views of an assembled front wall module on a vehicle body 2 of a motor vehicle.

The yoke beam 20 is screwed to the front wall part 21 of the front wall module. The yoke beam 20 is again screwed to a longitudinal beam 2*a* of the motor vehicle. For reasons of clarity, in FIG. 2 only a single longitudinal beam is shown, a longitudinal beam parallel to this is also located on the right vehicle side according to FIG. 2, but however is not shown there. The longitudinal beam 2*a* on its upper side comprises an adapter 2*b* which belongs to the longitudinal beam and which serves for the simple joining to the yoke beam 20. Screw holes 27 are likewise easily recognised in FIG. 2 which serve for the screwing of the front wall module to the region of the A-columns of a motor vehicle or to the region of the lower front wall formed by the vehicle body parts 2*c* and 2*d*.

Figure 4A:
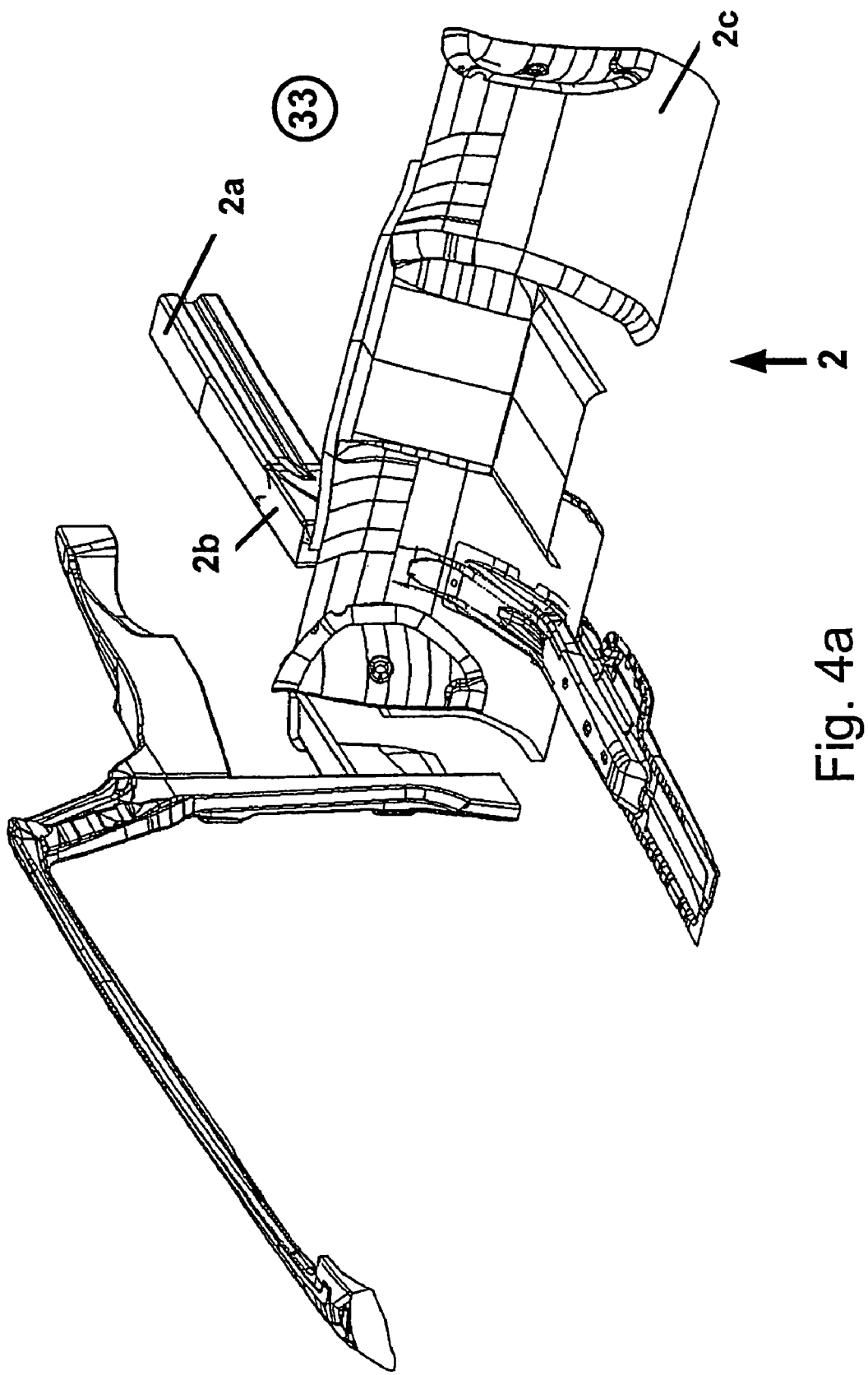

In the following, the individual components of the subject matters according to the invention are dealt with taking reference to the exploded drawing according to FIG. 3, which are specified in FIGS. 4*a* to 4*r*.

Figure 4C:
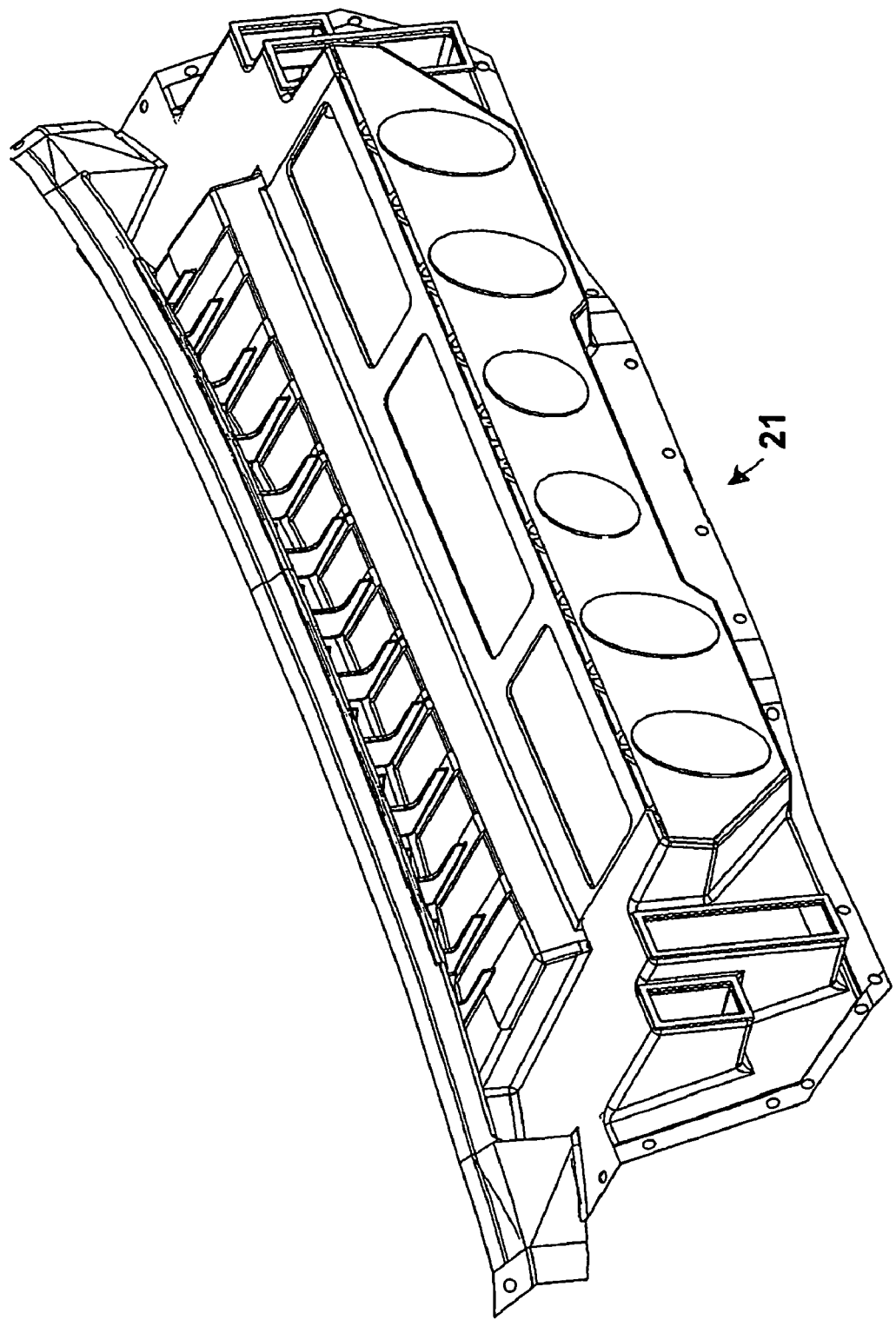
Figure 4D:
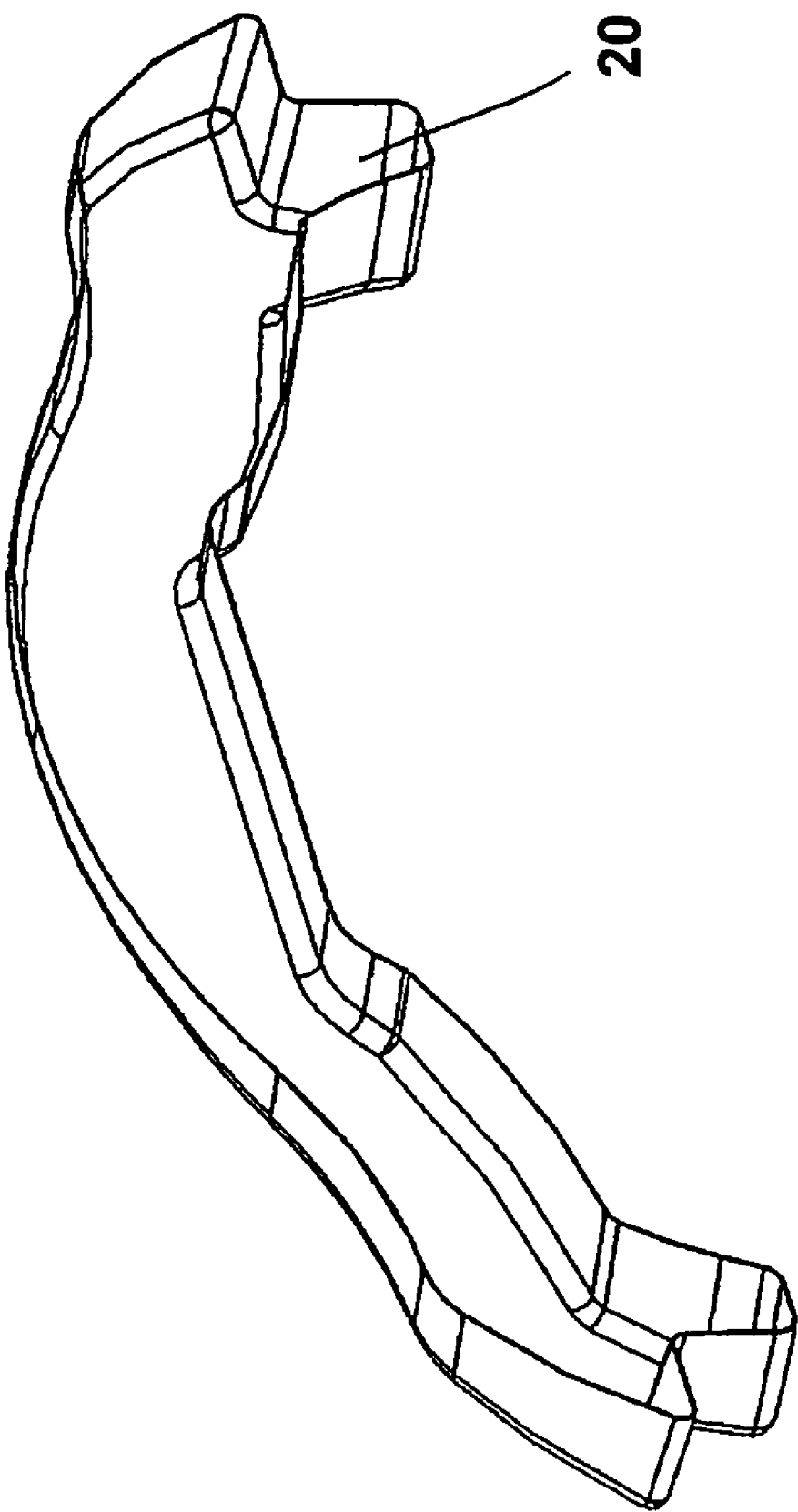
Figure 4E:
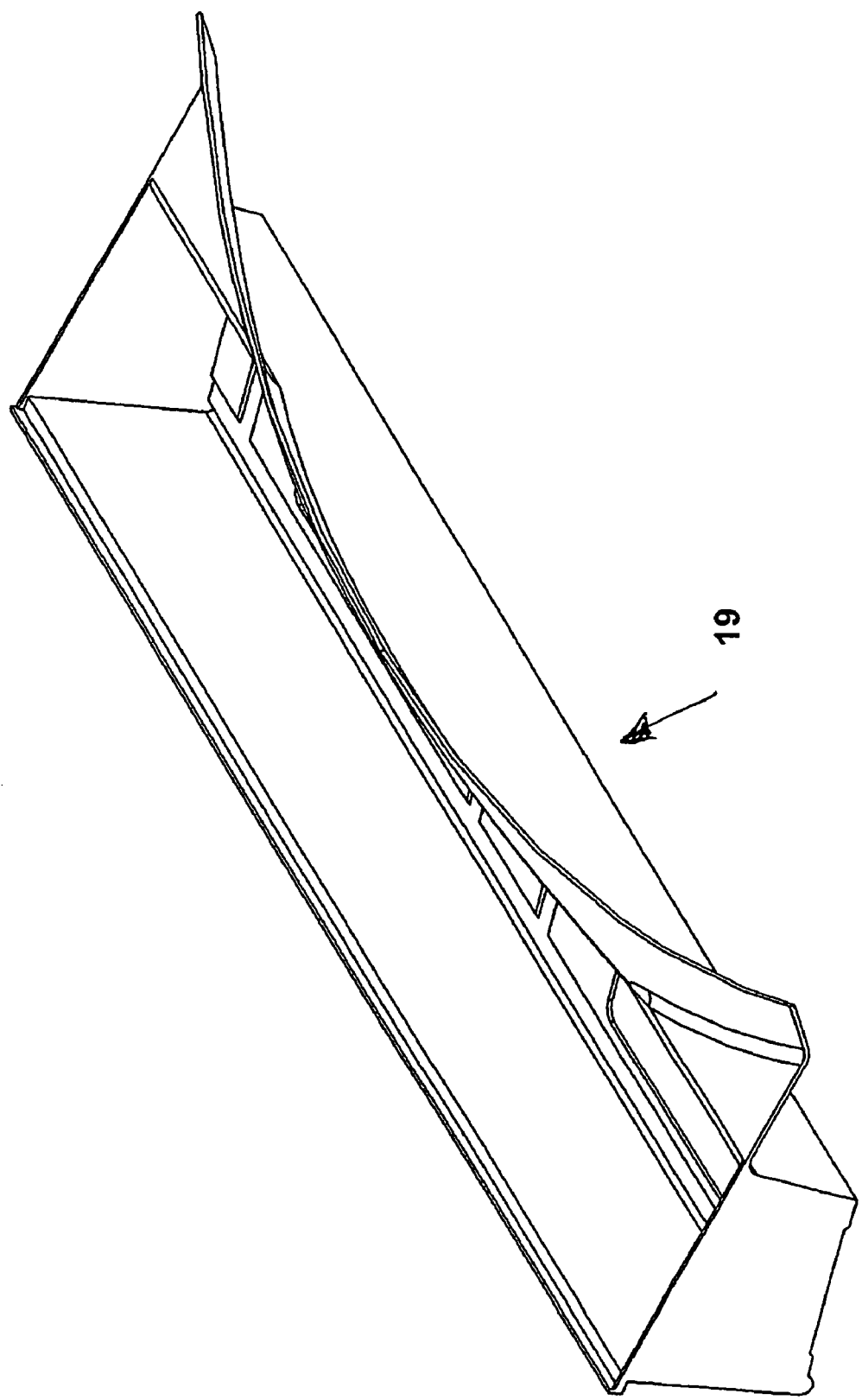

In FIG. 3 there is shown a vehicle body 2 with a vehicle floor 2*c* as well as a reinforcement of the vehicle floor 2*d* and a longitudinal beam 2*a* projecting to the front. A more detailed view with regard to this is to be deduced from FIG. 4*a* (in FIG. 4*a* in particular also the adapter 2*b* belonging to the longitudinal beam 2*a* is shown, which later may be screwed to the yoke beam 20). The upper front wall region which is open in FIG. 4*a* (indicated in FIG. 4*a* by the circled reference numeral 33) is closed by the front wall module 1. This front wall module 1 whilst forming the front wall, on its side distant to the motor vehicle interior comprises a front wall outer part 21 (see FIG. 3). The front wall outer part 21 is constructed as a hybrid part. It consists of a sheet metal wall 21*a* which is attached on the side distant to the vehicle inner space, and of a plastic part 21*b* with cross-struts or a honey-comb-like structure, which is arranged towards the vehicle interior. Details of the front wall outer part are to be seen in FIGS. 4*b* and 4*c*, wherein the screw holes 27 may also be recognised. At the same time, FIG. 4*b* shows a view of the front wall outer part 21 from the vehicle interior, FIG. 4*c* shows a view from the opposite direction. A reinforcement in the form of a yoke beam 20 with an essentially U-shaped cross section is screwed to that side of the front wall outer part 21 which is distant to the motor vehicle interior. This is screwed to the longitudinal beams 2*a* (see also FIG. 4*d* with regard to the details of the yoke beam). A water box 19 is screwed to the front wall outer part 21, which contains wiper motors 30 (see FIG. 4*e* for the water box).

Figure 4F:
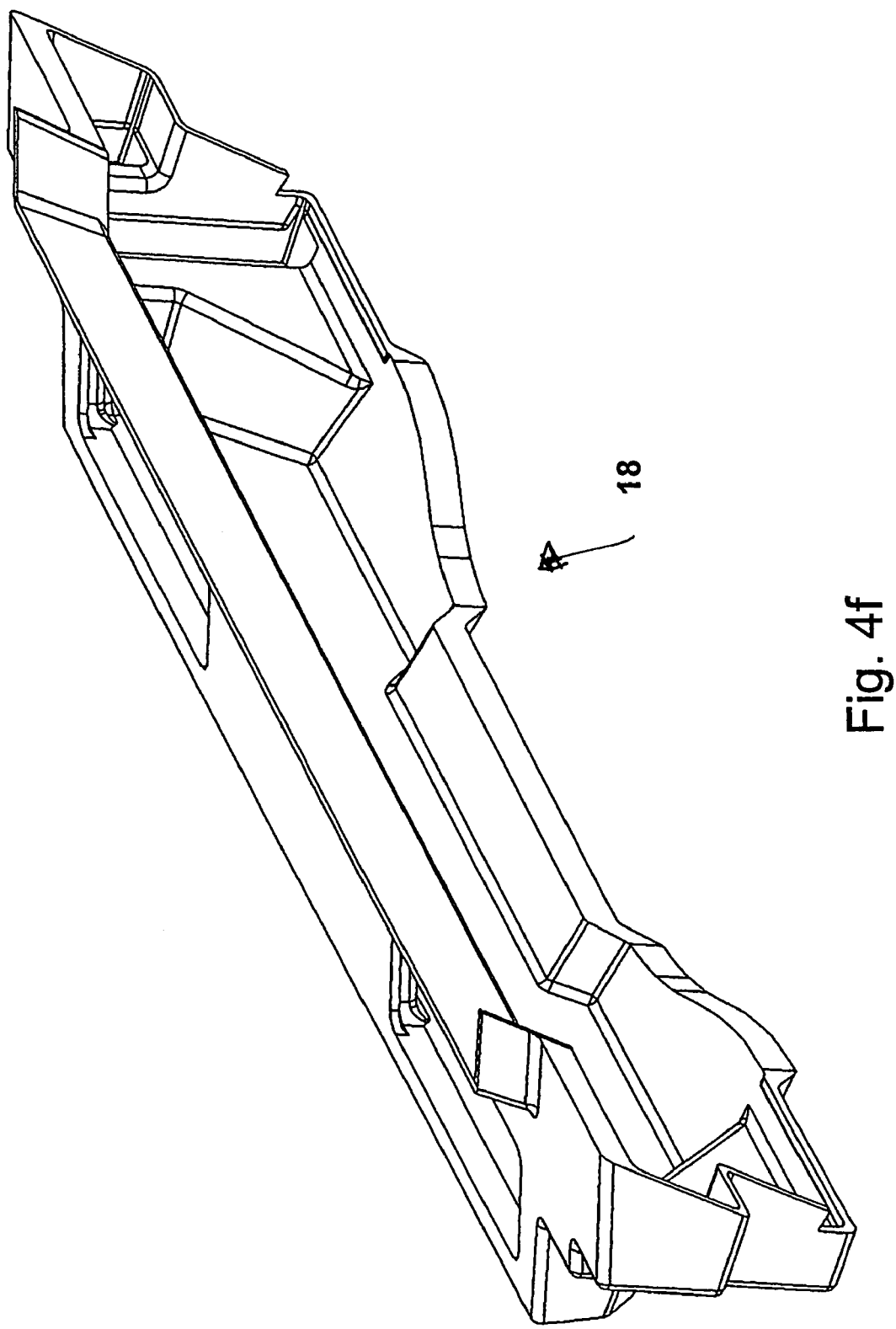
Figure 4G:
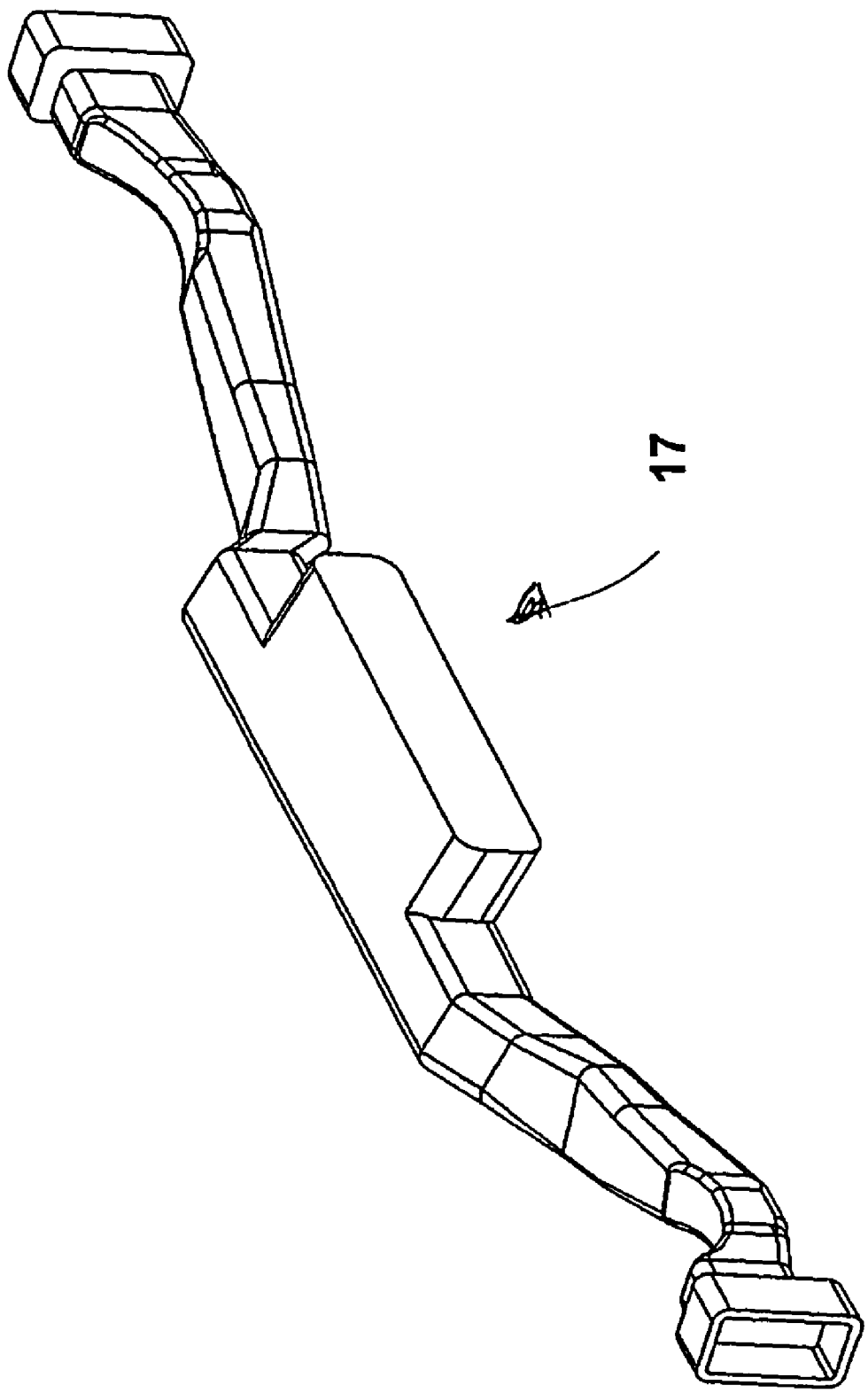
Figure 4H:
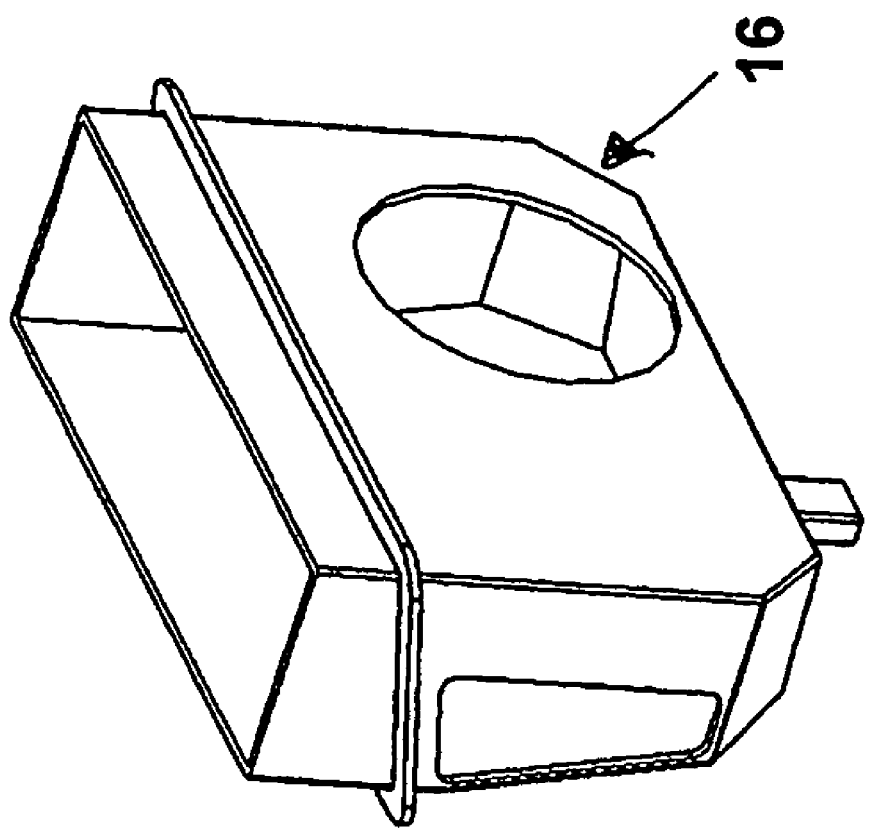

As a further layering, towards the vehicle interior, an insulation piece 18 for sound and thermal insulation is provided which is joined into the front wall outer part (see FIG. 4*f*) Proceeding from this further towards the vehicle interior are filter boxes 16 with filters 15 contained therein (see FIGS. 4*h* and 4*i*) for each vehicle side.

Figure 4J:
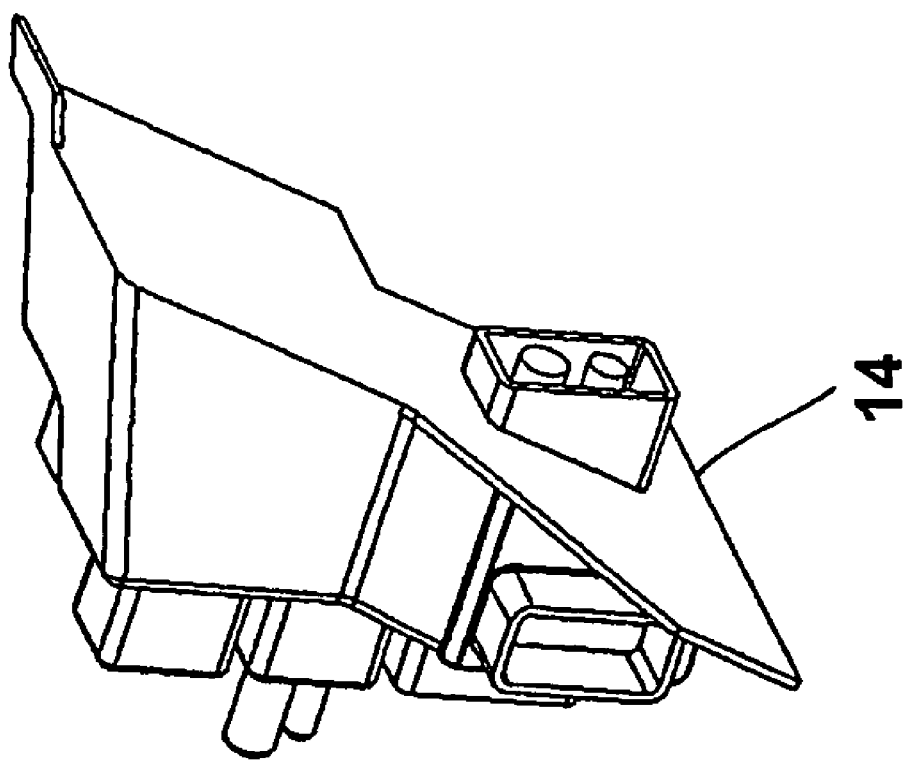
Figure 4K:
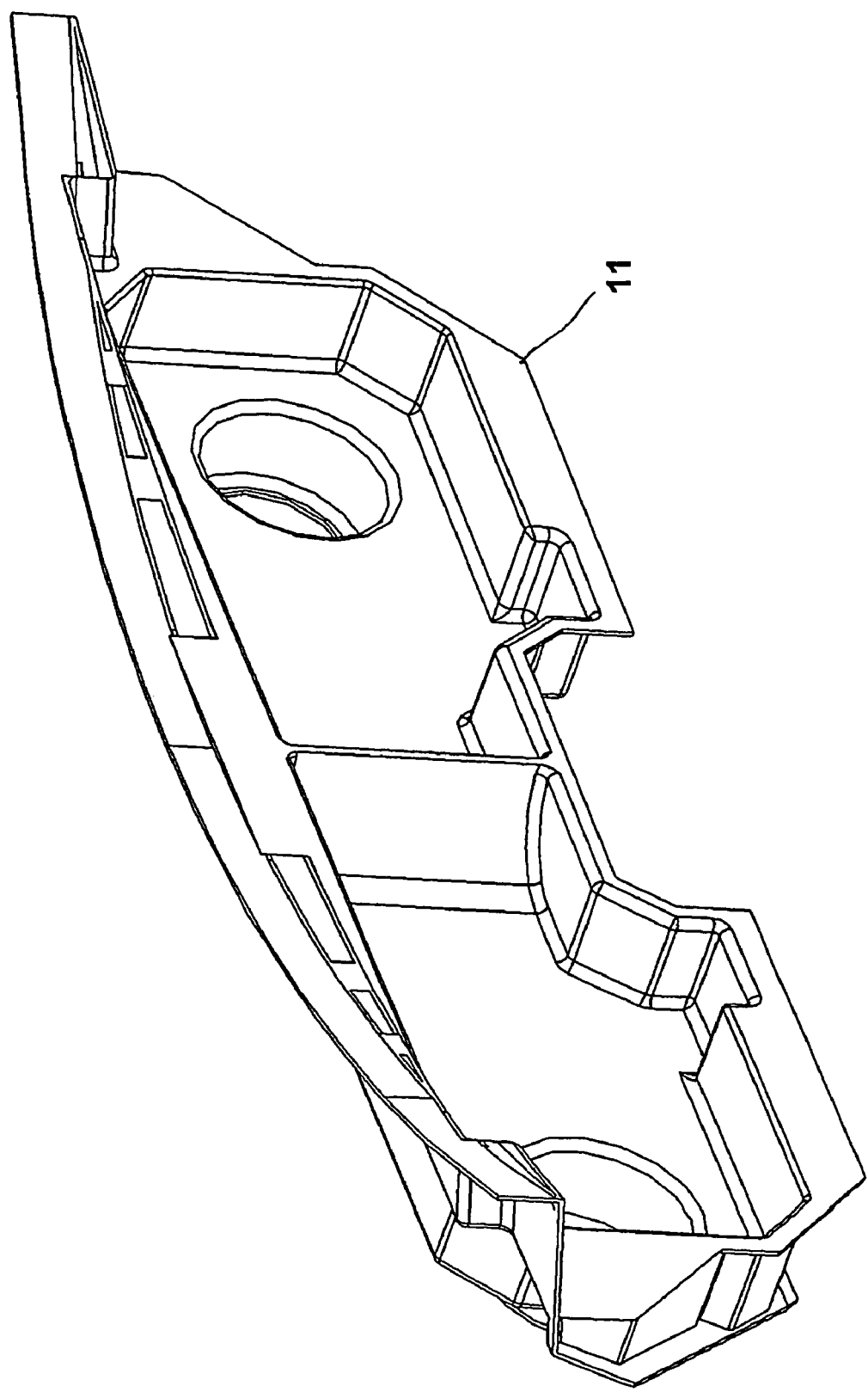
Figure 41:
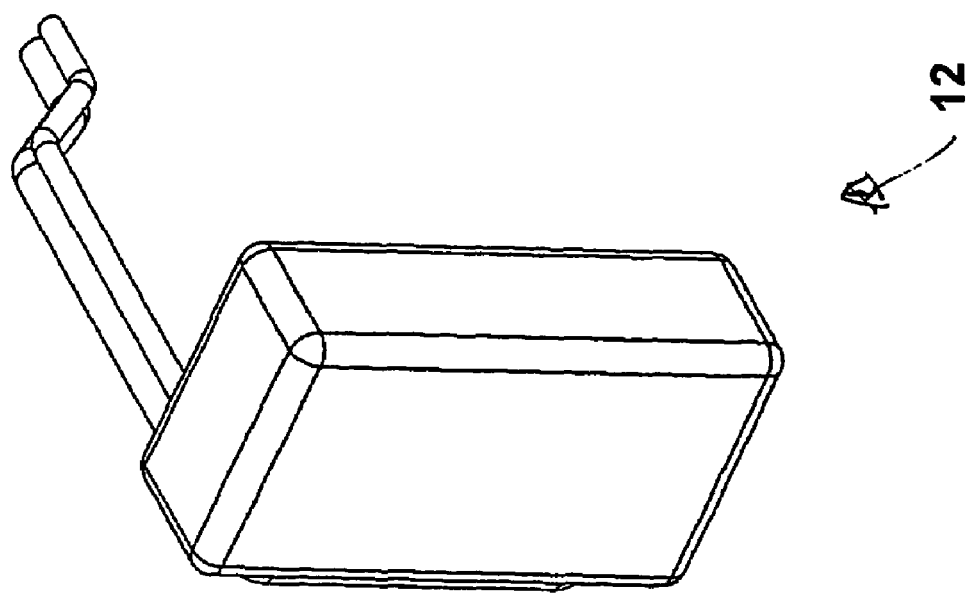
Figure 4M:
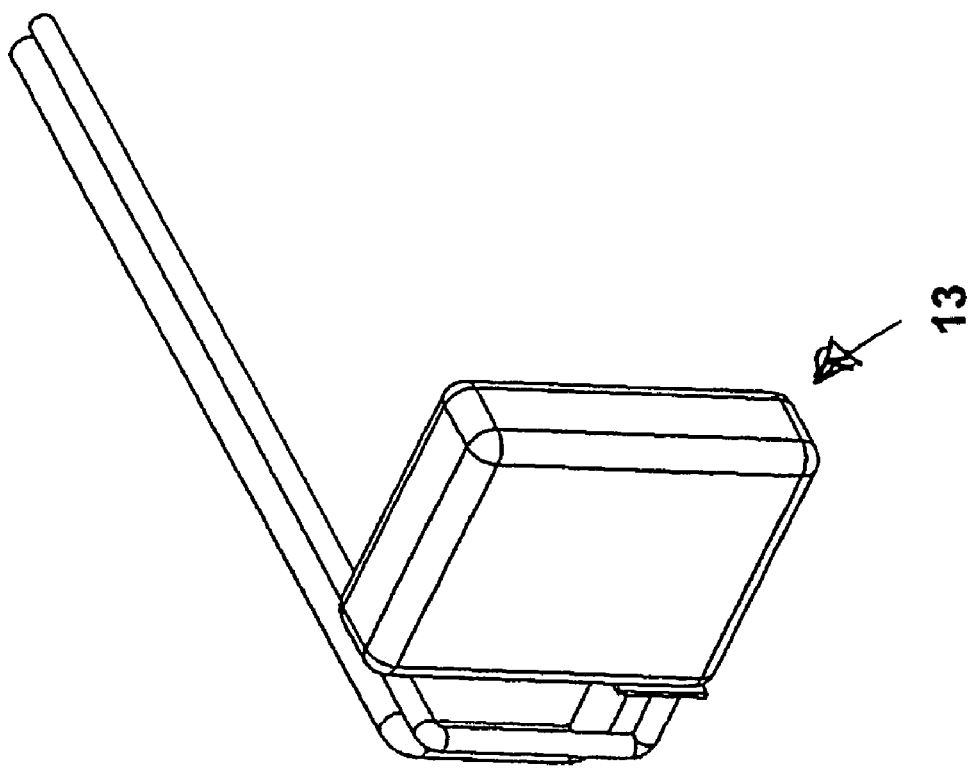
Figure 4N:
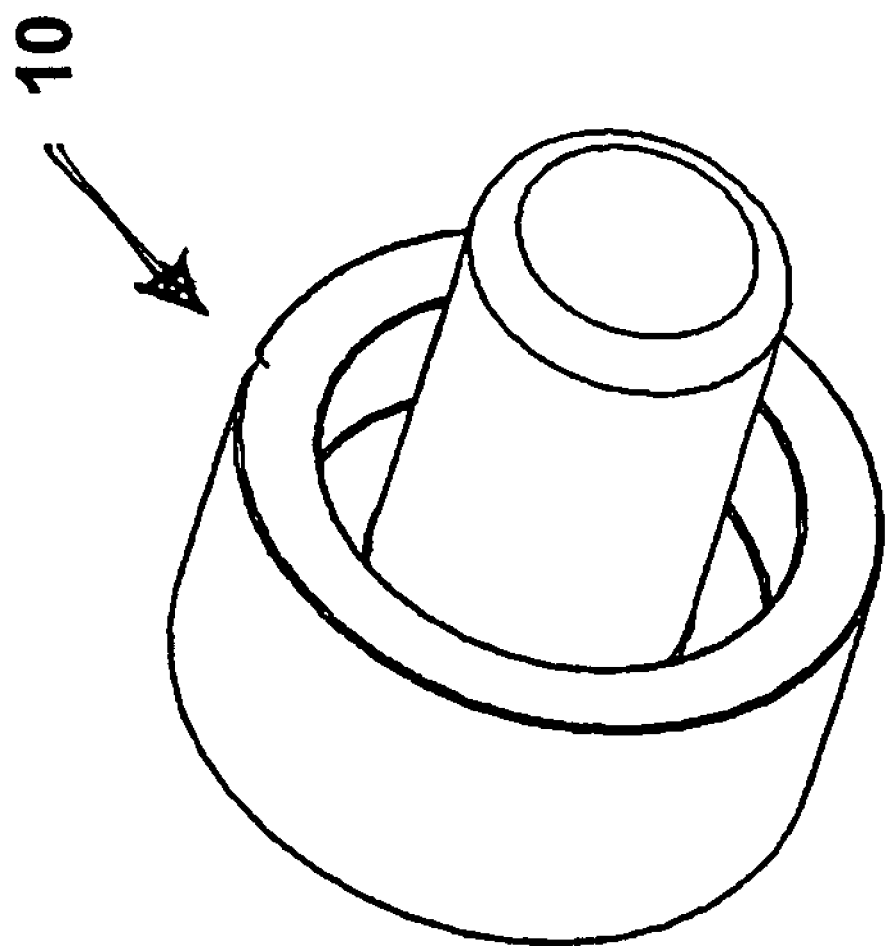
Figure 40:
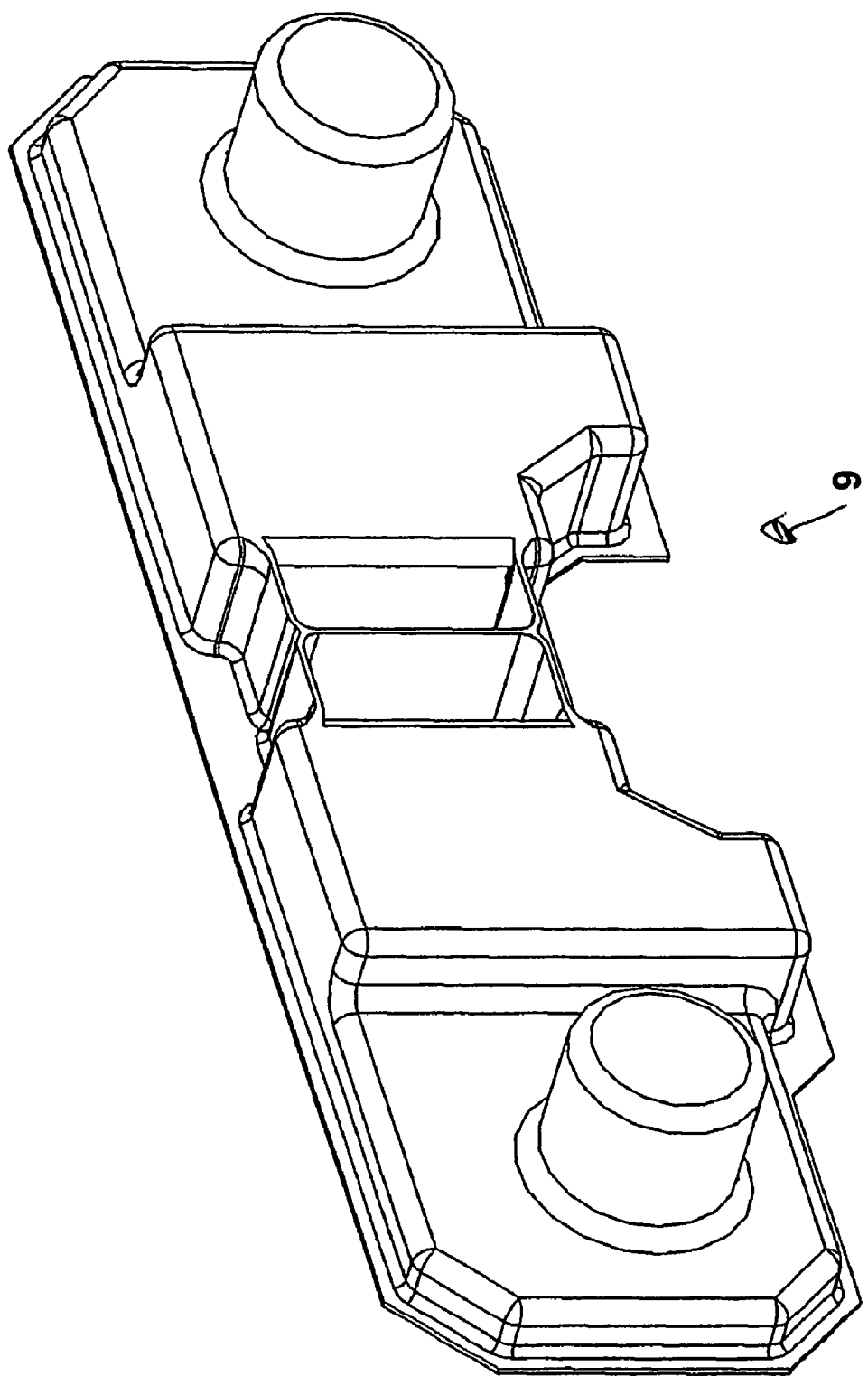
Figure 4P:
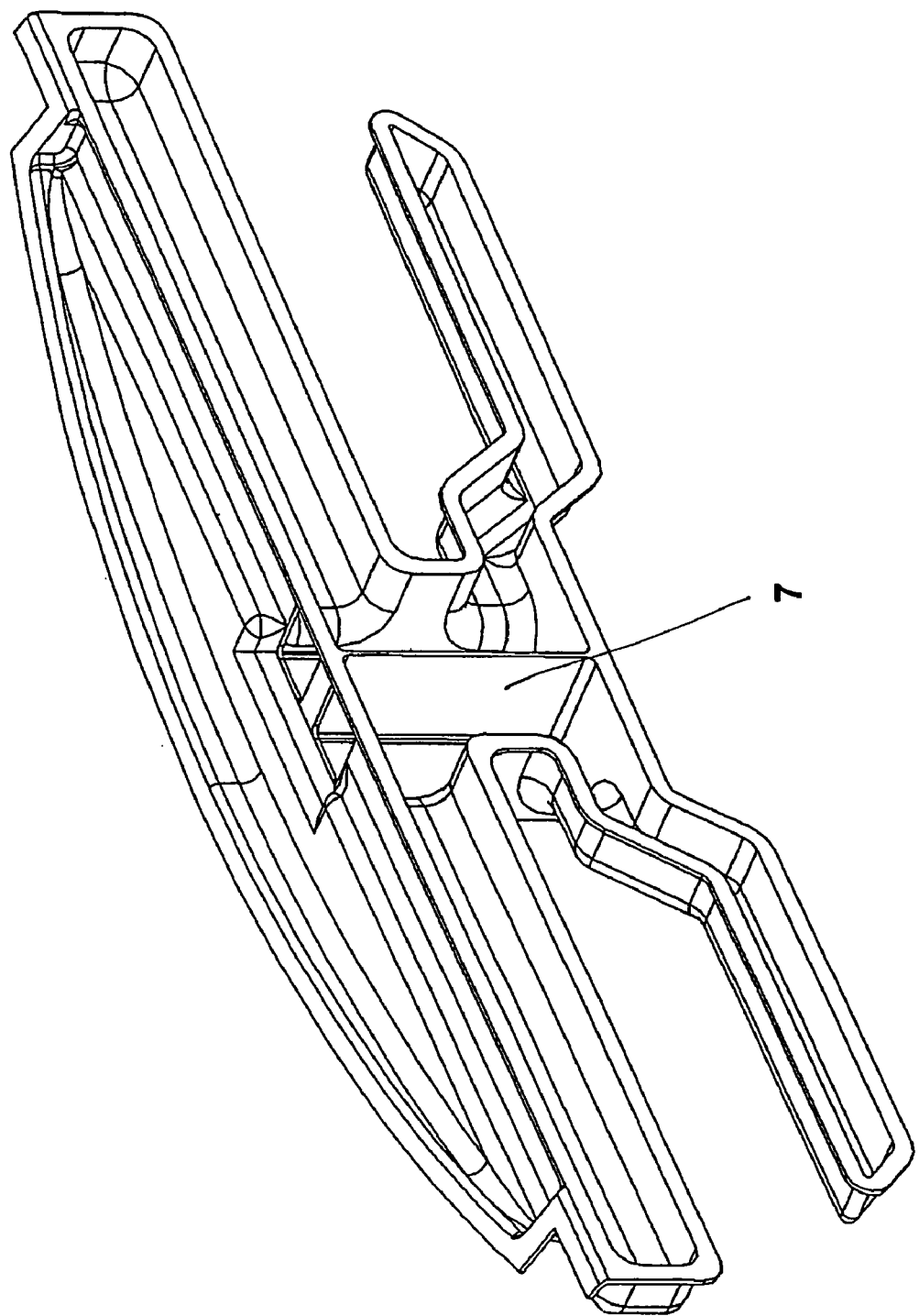

A cable loom 17 (see FIG. 4*g*) is also connected, which with its lateral run-outs on the right side and on the left side in the region of the A-columns of the vehicle body 2 is connected to the collectors 14 (see FIG. 4*j*, here the collector on the right side is shown). As a next layer, a sub-module for the air-conditioning is connected. An air-conditioning installation rear wall 11 (see FIG. 4*k*) as well as an air-conditioning front wall 9 (see FIG. 4*o*) include various parts for air-conditioning the vehicle inner space. These are (separated in each case on the left and right side for each vehicle half): an evaporator 12 (see FIG. 4*l*), a heating body 13 (see FIG. 4*m*) as well as a fan 10 (see FIG. 4n). Due to the grouping together of all air-conditioning apparatus into a single sub module, this may be very easily exchanged or may be realised individually depending on the desires of the customer (alternatives, no air-conditioning installation, air-conditioning installation, air-conditioning automatic [device]). Then, defroster channels 8 are connected on the left and right side to the air-conditioning installation front wall 9 as well as an air channel system 7 (see FIG. 4p) for air distribution in the inner space. Finally, the front wall inner part 6 is joined which is connected to the front wall outer part 21 and thus encompasses all those components which have just been mentioned. The inner and outer parts of the front wall may at the same time consists of practically any material, preferably plastics or sheet metal [pieces].

Figure 4Q:
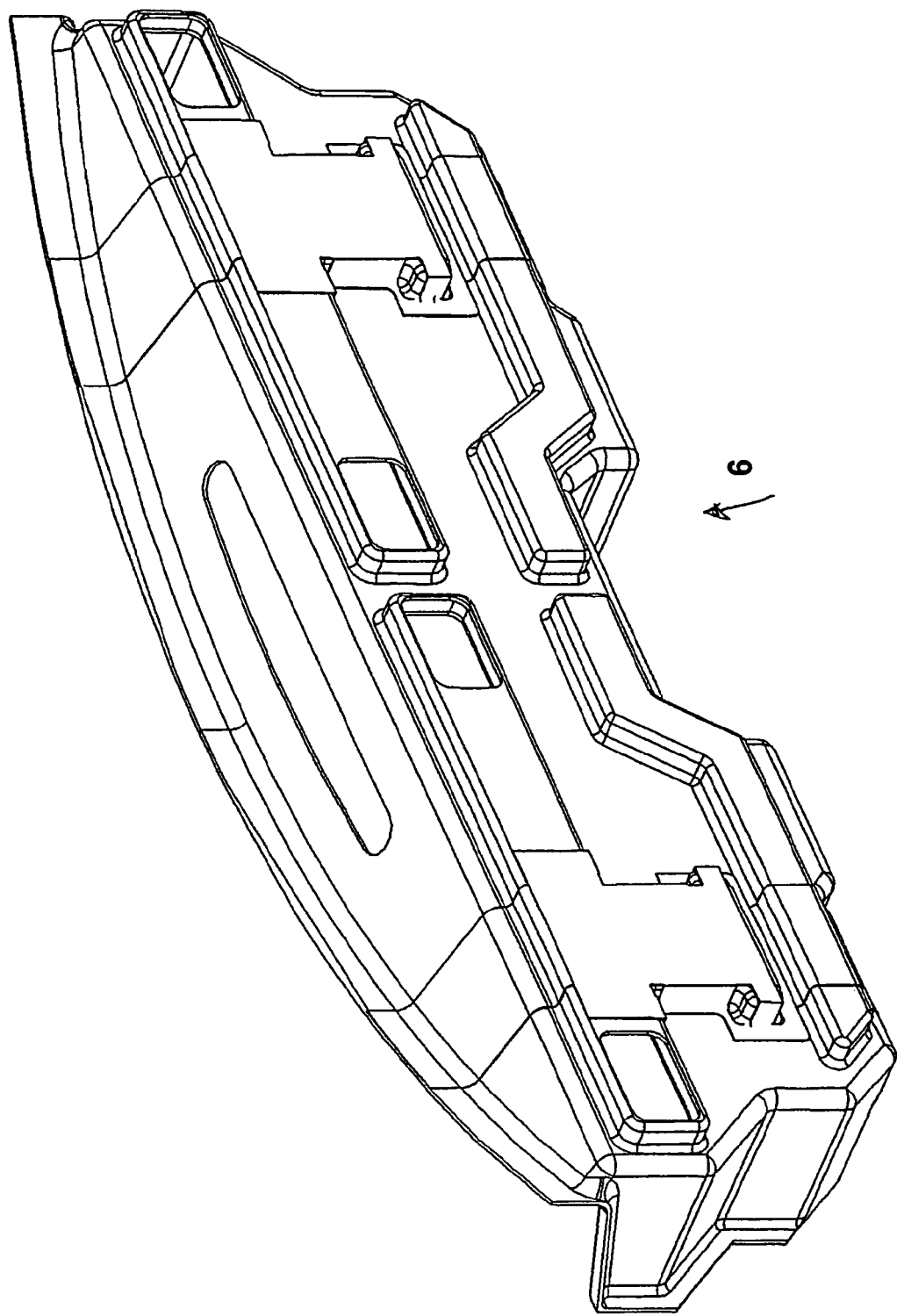

On the left and right side, reinforcement profiles 31 for accommodating the steering column 5 are attached to the front wall inner part. A control unit 3 may be attached below the front wall module 1. On the side of the interior, an outer skin 26 for the trim connects to the front wall inner part 6 (see also FIG. 4q). This comprises a discharge 27, a middle console 28 as well as a covering [panelling] 29 of the steering column 5.

Figure 4R:
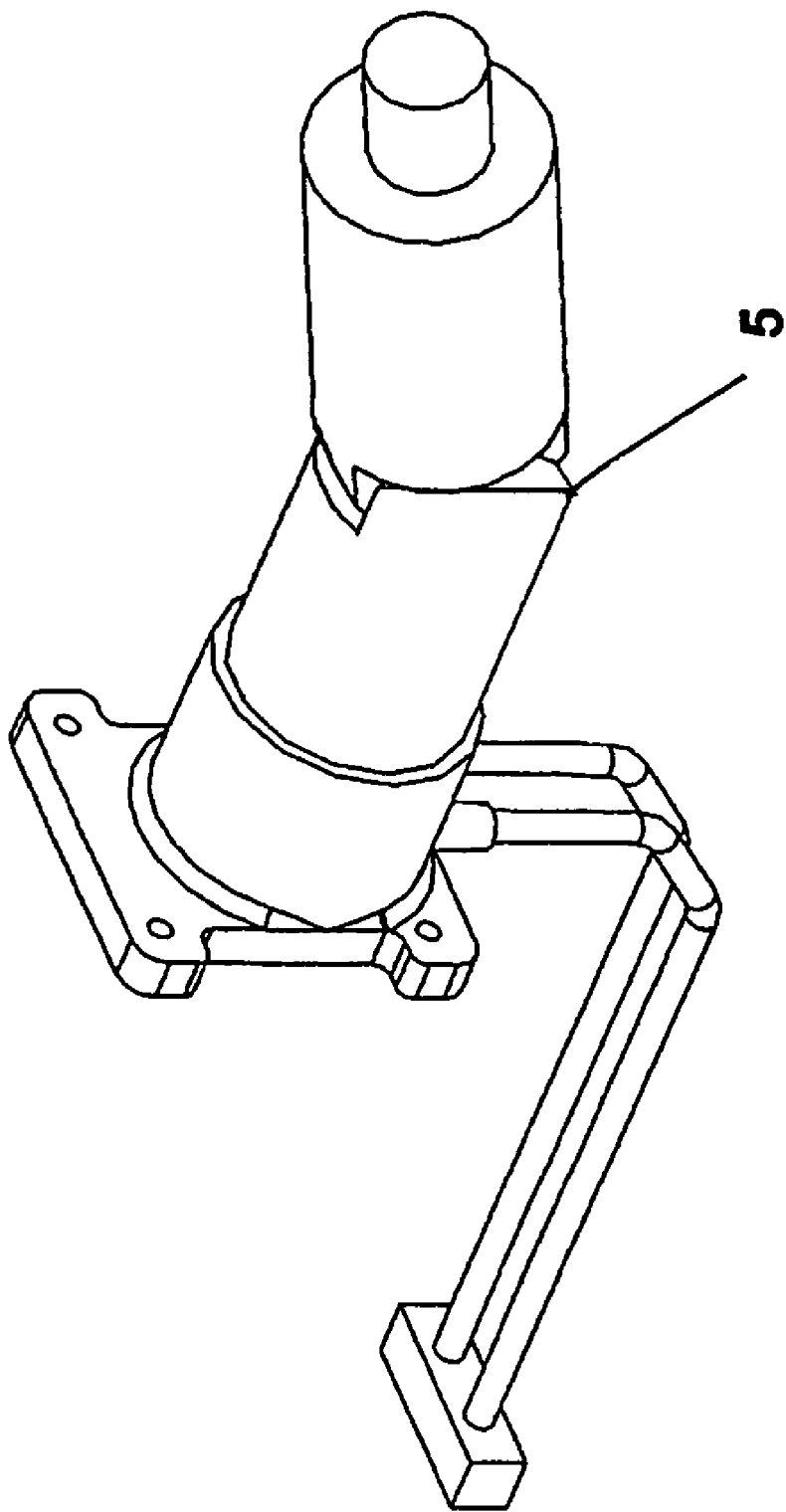

Then a steering wheel 32 connects to the steering column 5 (see also FIG. 4r).

The invention claimed is:

1. A motor vehicle, comprising:
   two longitudinal beams;
   a front wall; and
   a front wall module, the front wall module comprising
      a yoke beam connectable to the two longitudinal beams of the motor vehicle,
      wherein the two longitudinal beams comprise, at an upper surface of the two longitudinal beams, an attachment surface for the yoke beam,
      wherein the yoke beam bears directly upon the attachment surface formed by the two longitudinal beams, and
      wherein the front wall module includes a functional unit and forms at least one region of a front wall of the motor vehicle which delimits an interior of the motor vehicle.

2. The motor vehicle according to claim 1, wherein the functional unit includes a fan ventilating the interior of the motor vehicle.

3. The motor vehicle according to claim 1, wherein the yoke beam is connected to a remaining front wall module with a non-positive fit.

4. The motor vehicle according to claim 1, wherein the yoke beam is connected to the longitudinal beams with a non-positive fit.

5. The motor vehicle according to claim 1, wherein the yoke beam has a substantially U-shaped cross section.

6. The motor vehicle according to claim 1, wherein the functional unit includes at least one of a fan ventilating the interior, a filter, a heating body ventilating the interior, an evaporator of an air-conditioning installation, an air channel system, a control unit electrically controlling elements in the interior, a cable loom connected to the control unit and an airbag.

7. The motor vehicle according to claim 6, wherein the front wall module includes collectors connected to a cable loom as electrical interfaces between the front wall module and a remaining part of the motor vehicle.

8. The motor vehicle according to claim 7, wherein the collectors are attached at lateral outer sides of the front wall module.

9. The motor vehicle according to claim 1, wherein the front wall module has a cavity construction with an outer casing, the outer casing being formed by a front wall inner part orientated towards the interior and a front wall outer part distant to the interior.

10. The motor vehicle according to claim 9, wherein at least one of the front wall outer part and the front wall inner part is designed as a hybrid part of metal and plastic.

11. The motor vehicle according to the claim 9, wherein the front wall inner part includes at least one of (i) first receivers for a steering column which control the motor vehicle and (ii) second receivers for a dashboard.

12. The motor vehicle according to claim 9, wherein the functional unit is arranged at least partially within the outer casing.

13. The motor vehicle according to claim 9, wherein the front wall module has a layered construction, wherein the functional unit includes a plurality of sub-modules which are layered between the front wall outer part and the front wall inner part.

14. The motor vehicle according to claim 1, the front wall module further comprising:
   a hollow beam situated in an upper region of the front wall module, the hollow beam stabilizing the front wall module in a region of a windscreen of the motor vehicle.

15. The motor vehicle according to claim 1, the front wall module further comprising: a water box collecting fluid which runs down from a windscreen of the motor vehicle.

16. The motor vehicle according to claim 1, wherein the front wall module forms an upper part of the front wall.

17. The motor vehicle according to claim 16, wherein a lower part of the front wall has a hollow cross section.

18. The motor vehicle according to claim 1, further comprising:
   a driver motor situated on a side of the front wall which is distant to the interior.

* * * * *